United States Patent [19]
Roylance et al.

[11] Patent Number: 5,141,343
[45] Date of Patent: * Aug. 25, 1992

[54] COMPRESSIBLE/EXPANDABLE KEYBOARD WITH ADJUSTABLE KEY SPACING

[75] Inventors: William H. Roylance, 1654 Redondo Ave., Salt Lake City, Utah 84105; Byron D. Roylance, West Valley City, Utah

[73] Assignee: William H. Roylance, Salt Lake City, Utah

[ * ] Notice: The portion of the term of this patent subsequent to Sep. 30, 2008 has been disclaimed.

[21] Appl. No.: 727,198

[22] Filed: Jul. 9, 1991

Related U.S. Application Data

[63] Continuation of Ser. No. 594,875, Oct. 9, 1990, Pat. No. 5,044,798, and a continuation-in-part of Ser. No. 466,783, Jan. 18, 1990, abandoned.

[51] Int. Cl.$^5$ ................................................. B41J 5/08
[52] U.S. Cl. ..................................... 400/472; 400/477; 400/489; 400/492; 235/145 R; 200/5 R
[58] Field of Search ............... 400/472, 477, 488, 489, 400/492, 495; 340/711, 712; 235/145 A, 145 R, 146; 200/5 R

[56] References Cited

U.S. PATENT DOCUMENTS

| 3,499,515 | 3/1970 | Mikrut | 197/98 |
| 3,940,758 | 2/1976 | Margolin | 340/337 |
| 4,597,681 | 7/1986 | Hodges | 400/488 |
| 4,661,005 | 4/1987 | Lahr | 400/489 |
| 4,739,451 | 4/1988 | Kuba | 361/394 |

FOREIGN PATENT DOCUMENTS 2152437A 8/1985 United Kingdom .

OTHER PUBLICATIONS

G. G. Pechanek & B. M. Streepey, "Briefcase-Portable Textwriter with 100-Key Full-Size Keyboard", Sep. 1984, vol. 27, No. 4A, IBM Technical Disclosure Bulletin, p. 2002.
DuPont Pyralux literature (Oct. 1985).

Primary Examiner—Clifford D. Crowder
Assistant Examiner—Stephen R. Funk

[57] ABSTRACT

An extensible and compressible keyboard for application in computer, calculator, typewriter, and other similar applications where storage space is a premium. The keyboard provides adjustable spacing between the keys whereby a compact storage unit is expanded to a full-size, full function, and normally spaced standard keyboard or, as importantly, to a size which best fits the fingers of an individual user.

17 Claims, 4 Drawing Sheets

COMPRESSIBLE/EXPANDABLE KEYBOARD WITH ADJUSTABLE KEY SPACING

CONTINUITY

This application is a continuation of our copending U.S. patent application Ser. No. 594,875, filed Oct. 9, 1990, now U.S. Pat. No. 5,044,798, which is a continuation-in-part of U.S. patent application Ser. No. 466,783 filed Jan. 18, 1990, now abandoned.

FIELD OF INVENTION

This invention relates to keyboard apparatus and methods of use and particularly to a keyboard which can be compacted, protracted, and adjusted to vary the size of the keyboard and apparatus and methods for varying the spacing between the keys.

DESCRIPTION OF RELATED ART

Computers, calculators, typewriters, and other devices using keyboards have so improved technologically that one of the main limiting factors to their miniaturization has been the keyboard. Ergonometric factors and the size of human fingers have dictated the limits to how small a keyboard can be made. Thus, hand-held and lap top computers, calculators, typewriters, and such are limited in desirable miniaturization by the need to have sufficiently large keys and keypads which are acceptable by the general population. Further, separate, large desk top keyboards use more desk top space than would be required if they could be compressed into a small space when not in use, yet opened into a full-sized keyboard when in use. Still further, rigid keyboards now in use have a fixed distance between the keys, or at least between the switches to which the keys are physically connected. For this reason, a standard sized keyboard has been developed over the years which in many cases does not match well with every user's hand and fingers sizes. Mismatches between keyboard spacing and hand and fingers sizes result in excessive motion and typing errors.

To date, there appear to be three groups or kinds of art relating to size or space adjusting keyboards. A first group comprises keyboards made up of modules of fixed size, but foldable or detachable and reattachable to modify the length, width, and height dimensions when altering the keyboard mode from a storage to a usable configuration or vice versa. A second group comprises keyboards which allow modification of the relative spacing between keys, but do not change the overall footprint of the keyboard because the relative switch positions and associated printed circuit dimensions are fixed. A third group comprises keyboards made from keys of modular construction whereby the keys are placed anywhere within a predetermined matrix, thereby providing versatility in keyboard layout, but having a fixed footprint once the keyboard construction is complete.

Known art in the first mentioned group comprises U.S. Pat. Nos. 3,940,758 and 4,739,451 and IBM Technical Disclosure Bulletin, Volume 27, Number 4A, September 1984. U.S. Pat. No. 3,940,758 discloses an expandable keyboard for a pocket calculator, wherein hinged portions of a QWERTY keyboard are added in a stacked format to a calculator keyboard to form a unit which, when compacted, fills a space about as large as a conventional pocket calculator. U.S. Pat. No. 4,739,451 describes a modularly expandable keyboard which has expansion modules capable of being integrated into an elementary keyboard by locking tongues inserted in depressed tracks in the modules and held in place by detentes. The IBM Technical Disclosure Bulletin teaches a first unit comprising a QWERTY keyboard connected on each lateral side by foldable cables to a second and third unit. The second and third units comprise a footprint approximately half the size of the first unit and fold over the first unit to form a compacted state having about the same length and width as the first unit, alone.

U.S. Pat. No. 4,597,681 is a member of the second group comprising an adjustable keyboard which allows keys to be variably positioned above switches which comprise a fixed footprint. While each key cap, within limits predetermined by the maximum variable length of an adjustable shaft and rotational angle of the shaft as it leaves a spherical connection to an associated switch mounted in a recess in a fixed position carrier section, is spatially adjustable. The ultimate tying of each key cap to a fixed position carrier section maintains a fixed footprint independent of key cap position variation.

Representative of the third group is U.S. Pat. No. 3,499,515 which discloses a modular keyboard comprising keys that are basically identical in construction and a spatial matrix of accepting positions for the keys thereby permitting the positions of the keys to be changed or arranged as desired to make a special keyboard. However, the footprint of the frame is fixed once the keyboard layout is determined and is invariant in user application.

Art which is related to the three groups only insofar that it requires a fixed keyboard to operate is found in G.B. Patent 2,152,437 which discloses a mask which overlays a keyboard. The mask is made of resilient material allowing keys on the keyboard to be depressed through the mask. The mask is used therefore to change the indicia on the keyboard when special markings are desired.

No teachings or suggestions are found in any of the known related art which address the problem of making a protractable, compactable keyboard achieved through changing the relative spacing between the keys. This invention provides a novel keyboard wherein the relative spacing between the keys may be changed to better fit the finger structure of a user as well as providing a more convenient package for storage.

BRIEF SUMMARY AND OBJECTS OF THE INVENTION

In brief summary, this novel invention alleviates all of the known problems related to providing a compactable and expandable keyboard with adjustable key spacing. The invention comprises an extensible and contractible housing, a frame which extends and compresses with the housing, keypads and associated switches installed in the frame and thereby moved in relationship to each other so that the spatial orientation of the switches is protractable and compactable, and pliable interconnecting printed wiring which gathers and unfolds to permit movement of the switches within the housing. The printed wiring is formed with sections removed such that only simple, single dimensional folds occur when the keyboard is compacted. Specially formed keypads affect the vertical orientation of adjoining keypads to increase the compactability of the keyboard.

Accordingly, it is a primary object to provide a protractable and contractible keyboard.

It is a principal object to provide a housing which is expandable and contractible in at least one direction.

It is a further principal object to provide an extensible and compressible frame which attaches to and moves with the housing.

It is an important object to provide a plurality of keypads and switches installed into the frame which are moved in relationship to each other so that their relative spatial orientation is variable.

It is a further important object to provide a plurality of keypads and switches installed into the frame which are moved in relationship to each other such that their spatial orientation remains uniform.

It is a still further important object to provide keypads which nest with adjoining keypads upon compaction such that the surface area of a contracted keyboard is less than the total surface area of the keypads.

It is a main object to provide interconnecting wiring between the switches and control and timing circuits which pliably relocate as the switches move to provide continuous connection between the switches and the control and timing circuits.

It is a further main object to provide interconnecting wiring between the switches and control and timing circuits which is printed wiring.

It is a still further main object to provide interconnecting wiring which gathers with unidimensional bends.

It is a meaningful object to provide a dust cover interposed between the keypads and electrical parts.

These and other objects and features of the present invention will be apparent from the detailed description taken with reference to accompanying drawings.

DETAILED DESCRIPTION OF THE ILLUSTRATED EMBODIMENTS

In this description, the term proximal is used to indicate the segment of the device normally closest to the operator when it is being used. The term distal refers to the other end. The term superior refers to a higher or elevated position while inferior refers to a lower position. Reference is now made to the embodiments illustrated in FIGS. 1-16 wherein like numerals are used to designate like parts throughout.

Figure 1:
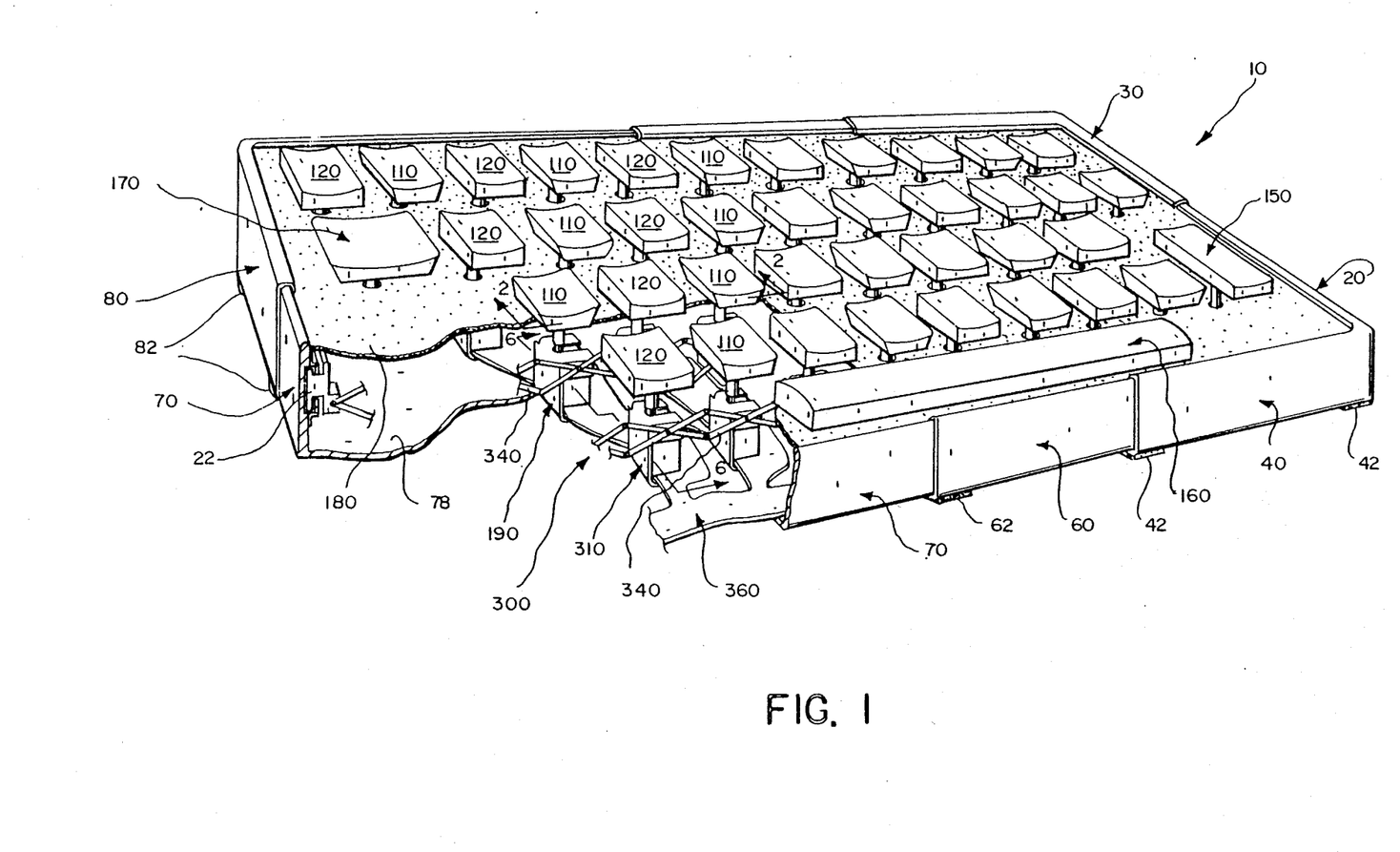
FIG. 1 is a perspective of a compressible and expandable keyboard with a section broken away to show normally hidden parts.

A currently preferred embodiment of a novel protractable and compactable keyboard 10 is seen in FIG. 1, wherein a section is broken away to show normally hidden parts. Keyboard 10 comprises an expandable and contractible housing 20, an extendable and compressible switch support frame 300, a plurality of switch assemblies 190, flexible and foldable printed wiring 360, and an optional compactable dust cover 180.

Figures 13, 14, 15:
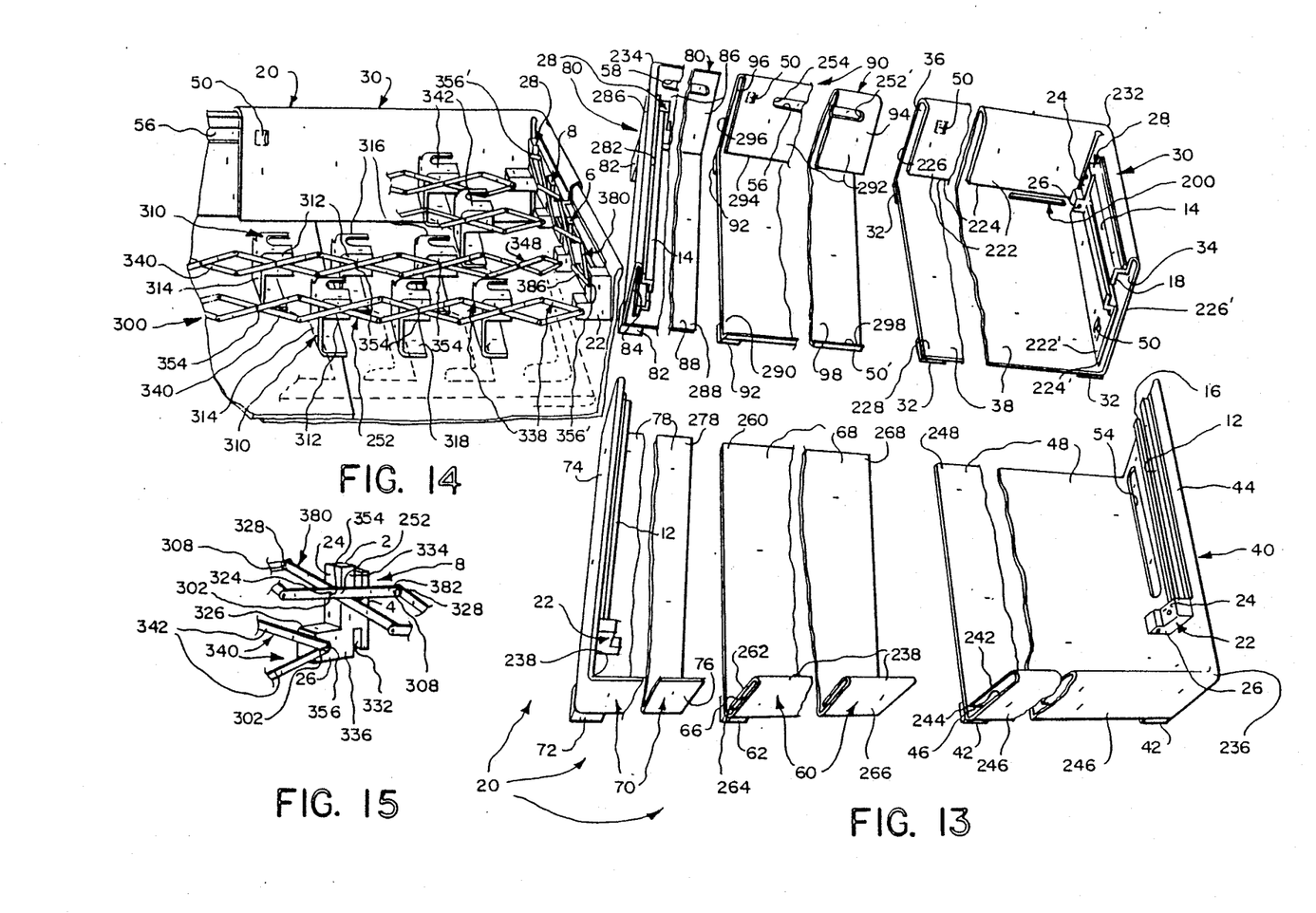
FIG. 13 is a perspective of the key-board housing parts showing a lateral edge portion of each part which is seen separated from each of the other housing parts.
FIG. 14 is a perspective of a switch assembly support frame.
FIG. 15 is a fractional perspective of an L-shaped support member whereby extensible supports for each expandable direction are commonly affixed.

Housing 20 comprises six major subassemblies or members one of which is a stationary corner 30 seen in the upper right hand corner of FIG. 13. Clockwise from corner 30, the other members are a right hand proximal corner 40, a proximal middle member 60, a left hand proximal corner 70, a left hand distal corner 80, and a distal middle member 90. Each member telescopically attaches to at least two other members. Unless otherwise specified, all housing members are formed of sheet steel, although other materials, such as rigid synthetic resinous material may be used.

Stationary corner 30 comprises a back wall 226 having a slit 200 wherethrough an electrical cable (not shown) is threaded to provide electrical communication between keyboard 10 and other electronic equipment to which it attaches. Corner 30 has been designated as stationary for purposes of describing the compactability and protractabililty of keyboard 10. However, corner 30 is only immobile with reference to slit 200 and, as is true of other keyboards, is capable of movement which is limited by the electrical communicating cable and connection to other equipment. Corner 30 further comprises a horizontal floor 38 which is distally extended vertically upward forming back wall 226 and also extended vertically upward on the right side forming side wall 226'. Walls 226 and 226' are joined to form upper left hand vertical corner 232. Wall 226 is bent inward and then downward to form inner wall 222 which is separated from wall 226 to provide a lateral slot 36. Inner wall 222 extends downward to a horizontal edge 224. Slot 36 comprises adequate separation to telescopically accept a vertical wall 94 of distal center member 90. Similarly wall 226' bends inward and then downward to form inner wall 222' which is separated from wall 226' thereby providing a lateral slot 34. Inner wall 222' extends downward to a horizontal edge 224'. Slot 34 comprises adequate separation to telescopically accept a vertical wall 44 of proximal corner member 40.

Further, in wall 222' a raised channel member 14 is formed comprising a channel 18 wherein a T-shaped slider of an extensible frame support 8, seen in FIGS. 14 and 15, is captured to provide a movable attachment for extensible frame supports as is explained in detail later. At the distal end of raised channel member 14, an L-shaped support member 28 is permanently attached for uses also described in detail later. Inferior to the position of raised channel member but above a lower edge 224' of inner wall 222' a stop 50 is placed. A second stop 50 is placed on inner wall 222. Description, placement and use of each stop 50 is explained in conjunction with a description of the two members, distal center member 90 and proximal corner member 40, that corner 30 telescopically accepts. Floor 38 further comprises a foot 32 at each corner to raise the housing 10 off a work surface. The heights of lower edges 224 and 224' above the floor 38 are set to provide clearance for the combined thickness and height of floors 48, 88, and 98 of members 40, 80 and 90, respectively, when keyboard 10 is compacted.

Distal middle member 90 comprises a horizontally disposed floor 98 which is distally extended upward to form back wall 296. At the top, back wall 296 is bent inward and then downward to form inner wall 292, which is separated from wall 296, thereby providing a lateral slot 96 having adequate separation to telescopically accept a distal vertical wall 86 of left hand distal corner 80. Downwardly extending inner wall 292 ends at a horizontal edge 294. Horizontal edge 294 resides far enough above floor 98 such that a floor 88 of left hand distal corner 80 slides freely therebetween when vertical wall 86 is telescopically inserted into slot 96. Floor 98 is longer than the length of floor 88 such that a vertical bend 50' on the proximal end of floor 98 does not impede the telescoping action of left hand distal corner 80 as it telescopes into lateral slot 96. Bend 50' provides a raised edge to support other floor segments of housing 20 above floors 88 and 98 thereby eliminating any possibility of contention between floor segments during housing 20 compaction.

The planar surface of inner wall 292 comprises a horizontal slit 56 comprising two blind ends, 252' and 254, and a length which determines the length of travel of telescoping member 94 in slot 36. Each stop 5 is formed by inwardly depressing material from the surface to provide a slit entering enlargement. Each stop 50 is vertically disposed to be captured inside a slit whereby each stop travels within an associated slit and blocks further expanding or contracting travel when the stop impacts a blind end of the slit. Horizontal slit 56 and the stop 50 in inner wall 222 are disposed at the same vertical height on inner walls 292 and 222, respectively. During assembly inner wall 222 is pulled proximally to allow the entering blind end 252 to pass by the stop 50. Once blind end 252' has passed stop 50, inner wall 222 is released and stop 50 engages slit 56 providing both expanding and contracting travel limits for distal center member 90 relative to stationary corner 30. Each of the telescoping pairs comprise similar slit, stop 50 pairs. As seen in FIG. 13, a stop 50 in inner wall 292 pairs with slit 58 to limit length of travel between distal middle member 90 and left hand distal corner member 80. Slit 54 and the stop 50 previously described for inner member 222' limit proximal travel of right hand proximal corner 40 relative to stationary corner 30. Such pairs exist for all telescoping parts in housing 20; however, no others are shown in the FIGS.. A foot 92 is placed upon each corner of the bottom of floor 98 on the side distal from stationary corner 30. The thickness of each foot 92 is predetermined to maintain keyboard 10 level on a level surface.

Left hand distal corner 80 comprises a horizontal floor 88 which distally is extended vertically upward to form back wall 86 and is also extended vertically upward on the left side to form side wall 286. Walls 86 and 286 are joined to form upper left hand vertical corner 234. Wall 86 is formed to telescopically slide into lateral slot 96. Wall 286 bends inward and then downward to form inner wall 282 which is separated from wall 286 thereby providing a lateral slot 84. Slot 84 comprises adequate separation to telescopically accept a vertical wall 74 of left proximal corner member 70. Construction of wall members 286 and 282 and associated parts are the same as wall members 226' and 222', but of opposite hand. A foot 82 is placed upon each corner of the bottom of floor 88 on the side distal from distal middle member 90. The thickness of each foot 82 maintains keyboard 10 level on a level surface.

Proximal right hand corner comprises a horizontal floor 48 which proximally is extended vertically upward to form front wall 246 and is also extended vertically upward on the right side to form side wall 44. Walls 44 and 246 are joined to form proximal right hand vertical corner 236. Proximal wall 246 bends inward to form inner wall 242 which is separated from wall 246 to provide a lateral slot 46 and ends at lower edge 244. Slot 46 comprises adequate separation to telescopically accept a vertical wall 238 of proximal center member 60.

A raised channel member 12 is attached to the inner side of wall 44. Raised channel member 12 comprises a channel 16 wherein a T-shaped slider, similar to that shown for extensible frame support 8 of FIG. 15, is captured to provide a movable attachment for an extensible frame support 6 as is explained in detail later. Also, raised channel member 12 is formed to telescopically fit into the hollow interior of channel member 14 when wall 44 is telescopically inserted into slot 34. When so inserted, channels 16 and 18 are juxtaposed providing a common opening and channel wherein at least extensible frame support 6 travels. At the proximal end of raised channel member 12, an L-shaped support member 22 is permanently attached for uses which are to be described in detail later. Floor 48 further comprises a foot 42 at each proximal corner to raise the housing 20 off the work surface and level keyboard 10 when it resides on a level surface. The height of lower edge 244 above floor 48 allows clearance, when keyboard 10 is compacted, for the combined thickness and height of floors 68 and 78 of telescoping members 60 and 70, respectively.

Proximal middle member 60 comprises horizontal floor 68, front wall 266 and contiguous inner wall 262. Floor 68 is proximally extended upward to form front wall 266. At the top, front wall 266 bends inward and then downward to form inner wall 262 which is separated from wall 266, thereby providing a lateral slot 66 having adequate separation to telescopically accept a proximal vertical wall 76 of left hand proximal corner 70. Downwardly extending inner wall 262 ends at an edge 264 which resides far enough above floor 68 to allow a floor 78 of left hand proximal corner 70 to slide freely therebetween when vertical wall 76 is telescopically inserted into slot 66. A foot 62 placed upon the bottom of the left hand corner of floor 68. The thickness of foot 62 maintains keyboard 10 level on a level surface.

Left hand proximal corner 70 comprises horizontal floor 78, left hand wall 74 and proximal wall 76. On the left hand side, floor 78 is extended upward to form left hand wall 74. Proximally, floor 78 is extended vertically to form proximal wall 76. Walls 74 and 76 are joined to form corner 238. Parts attaching to the inner side of left hand wall 74 are identical to, but of opposite hand as, the parts attached to right hand wall 44 of right proximal corner 40. A foot 72 is placed upon the bottom left hand corner of floor 78. The thickness of each foot 72 maintains keyboard 10 level on a level surface.

When assembled and completely expanded in both dimensions, corner 298 of distal middle member 90 lies directly upon corner 228 of the stationary corner 30. Corner 288 of left hand distal corner 80 lies directly upon corner 290 of distal middle member 90. Corner 248 lies directly upon the raised member of bend 50' above corner 298 of distal middle member 90. Corner 268 of proximal middle member 60 lies upon corner 248. Corner 278 of left hand proximal corner 70 lies upon corner 260 of proximal middle member 60. Thus, when housing 20 is compressed, in order of superiority of the floors is 38, 98, 88, 48, 68, and 78, from bottom to top.

Reference is now made to FIG. 14. As is later described in detail, switch support frame 300 provides support for a plurality of switch assemblies 190, as seen in FIGS. 2-3 and 6-7. However, all switch assemblies 190 are removed from the switch support frame in FIG. 14 for clarity of description of details of the frame, itself. Switch support frame 300 comprises one extensible support member 340 for each row of keys on keyboard 10, a switch support 310 for each switch assembly 190 on keyboard 10, two longitudinal extensible supports 380, and two L-Shaped support members for each extensible support member 340. In a currently preferred embodiment comprising four rows of keys as seen in FIG. 14, two sets of L-shaped support members 22, 6, 8, and 28 are provided, one such set on each lateral side of keyboard 10. Only the right hand set is seen in FIG. 14.

Figure 5:
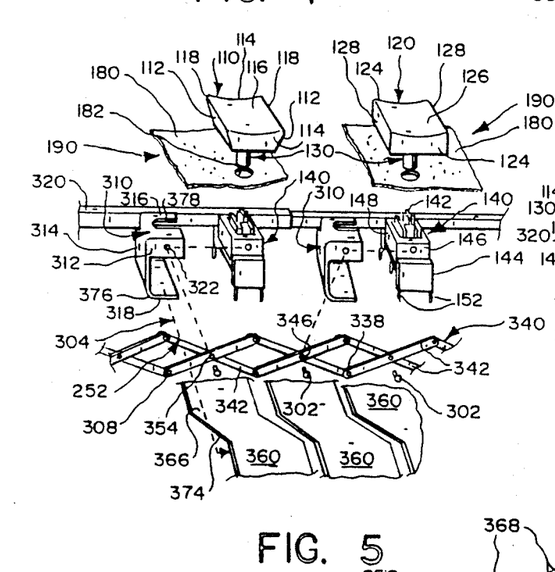
FIG. 5 is an exploded perspective of two of the switch assemblies of FIG. 1 including sections of a related dust cover and flexible printed wiring.
Figure 16:
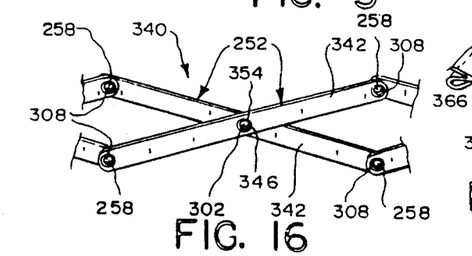
FIG. 16 is a magnified perspective of a portion of an extensible support member of the switch assembly support frame seen in FIG. 14.

Each extensible support member 340 comprises a series of X-shaped linkages 252. As seen in FIGS. 5, 14 and 16, each linkage 252 comprises two steel strips, each forming a support member 342. Each support member 342 comprises a central hole 346 and a hole 258 in each end. Each X-shaped linkage 252 is formed by hingeably fastening the center of one support member 342 to the center of another support member 342 by a rivet or bolt 302. The point of attachment of the center of each X-shaped linkage is also referred to as a node 354. As described in detail later, rivet or bolt 302 is further used to connect extensible support 340 to other parts at node 354 which ultimately determines each switch assembly 190 position in keyboard 10. Each X-shaped linkage 252 is connected end to end at holes 258 by a rivet or bolt 308 to another X-shaped linkage 252 successively to form extensible support 340. Between holes 346 where the central linkage occurs a parallelogram 338 is formed. See FIG. 14. If extensible support 340 is oriented such that the ends of extensible support 340 are level, holes 346 and nodes 354 remain substantially level as extensible support 340 expands and contracts. Thereby any parts connected to holes 346 remain at a level as extensible support 340 varies in length. In addition, the distances between holes 346 and, therefore, nodes 354 vary proportionally with changes in length of extensible support 340.

L-shaped support members comprise two types, hard mounting and sliding. As seen in FIGS. 13 and 14, a hard mounting L-shaped support member 22 is affixed to right proximal corner 40, as earlier described. Another L-shaped support member 28 is affixed to stationary corner 30. Similarly, but of opposite hand, another L-shaped support member 22 and another L-shaped support member 28 are affixed to left hand corners 70 and 80 of housing 20, respectively.

An L shaped sliding support member 8 comprising a vertical leg 334 and a base leg 336 is seen in FIG. 15. When assembled in housing 20, L-shaped proximal side 26 and distal side 326 provide orthogonal extensions from channel 18. The rear facing side 2 of vertical leg 334 of L-shaped sliding support member 8 provides attachment for a T-shaped slider 4. In combination, juxtaposed surfaces of the exposed portion of rear facing vertical side 2 and T-shaped slider 4 comprise grooves 332 which are captured within channel 16 for slidable containment therein. Thereby, L-shaped support member 8 provides a firm attachment to the lateral sides of corners 30 and 80 but freely slides distally and proximally as the width of housing 20 is expanded and contracted.

To base leg 336 of one of the L-shaped sides such as L-shaped proximal side 26 as seen in FIG. 15, an end node 356 is hingeably attached. End node 356 comprises a node 354 of a truncated X-shaped member wherein one end of each support member 342 is cut off to form a "V". The length of base leg 336 and position of attachment of end node 356 is determined by the desired lateral position of a closest switch support 310. Each switch support 310 is connected to a node 354 as is explained in detail hereafter. If the lateral distance between a base leg 336 and closest switch support 310 requires an extension, a smaller parallelogram section, such as parallelogram 348, seen in FIG. 14, may be inserted between base leg 336 and closest switch support 310 node 354.

A detailed drawing of L-shaped support member 6 is not shown; however, L-shaped support member 6 is similar in shape and function to L-shaped support member 8. Differences between L-shaped support members 6 and 8 comprise (1) the groove of L-shaped support member which correlates to groove 332 is deeper to provide sliding space within both channels 16 and 18, (2) the width of L-shaped proximal and distal sides of L-shaped support member 6, which relate to sides 26 and 326, respectively, and which correlate with vertical leg 334 of L-shaped support member 8, are adjusted to provide an attachment face of L-shaped support member 6 which is in the same plane as the correlating attachment face 24 of L-shaped support member 8 (as is true of correlating faces of L-shaped support members 22 and 28, for reasons described hereafter in detail), and (3) the point of connection of associated end node 356 which is determined by the desired positioning of the closest support 310 in each different keyboard 10 layout.

Each longitudinal extensible support 380 is similar in construction to an extensible support member 340. For a four row keyboard 10, three parallelograms 386 comprising two end nodes 356' and a node 354 connected to a front face 24 of each sliding L-shaped support member 6 and 8 are required on each side of support frame 300. As is true of parallelograms 338, parallelograms 386 are formed from X-shaped linkages 252 formed by metal strips 382, each comprising a central hole 324 through which a connecting pin 302 is inserted to form a hingeable connection. Each connecting pin 302 further connects to an L-shaped member to form associated connecting node 354. Successively, each X-shaped linkage 252 comprises a hole 328 in each end of forming support member 382 whereat X-shaped linkage 252 is connected by a bolt or rivet 308 to form each parallelogram 386. For each keyboard comprising various numbers of rows of keys, the number of parallelograms is more less than the number of rows.

As is seen for the right side of support frame 300 in FIG. 14, the two end nodes 356', connected to hard mounted L-shaped support members 22 and 28, cause the support frame 300 to follow the movement of corners 40 and 70 relative to corners 30 and 80, respectively, when the width of housing 20 is changed. With the connection of each L-support member 28, 6, 8, and 22 to corner members 30 and 40 and with similar L-support members connected to corner members 70 and 80, switch support frame 300 laterally extends and compresses as the length of housing 20 is changed. Thus, switch support frame 300 extends and compresses in two dimensions as a result of expansion and contraction, respectively, of housing 20.

Connected to each node 354 is a switch support 310, where a switch assembly 190 is placed as seen in FIGS. 1-7 and 14. Each switching assembly 190 comprises a switch 140, a keypad connecting stem 130, and a keypad, 110 or 120. Each switch support 310 comprises mechanical or adhesive attachment to a switch 140, providing support thereby against pressure applied by a user on keyboard 10. As seen in FIG. 5, switch support 310 comprises a top part 316, comprising a slot 378 which allows superiorly directed passage of a stem 130 and a stem connection 142 from switch 140, a lateral side part 314 which extends vertically downward from top part 316 to a corner 376 from which an inferior horizontal part 318 extends, and an attachment part 312 which comprises a node 354 which is juxtaposed to connecting orifice 322. The inferior horizontal part 318 provides support and stress relief for flexible printed wiring 360 as described in more detail hereafter. A rivet or bolt 302 which interconnects the two support members 342 and forms node 354 also hingeably affixes switch support 310 to associated extensible support 340 through connecting orifice 322.

Figures 3, 6:
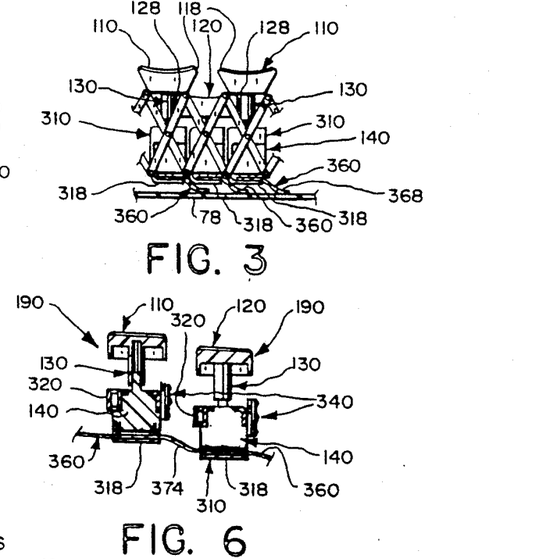
FIG. 3 is a side view of the three switch assemblies of FIG. 2, wherein the switch assemblies are closely compacted.
FIG. 6 is a side view, taken along lines 6—6 of FIG. 1, showing two switch assemblies in separated position as seen from the side or end of the keyboard.
Figure 7:
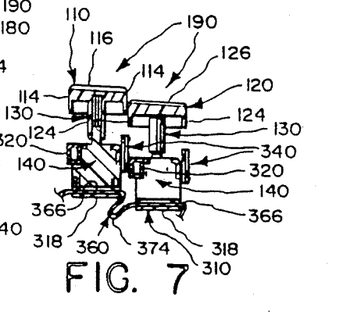
FIG. 7 is a side view of the two switch assemblies of FIG. 6 shown in close proximity.

An optional telescopically lengthening, stabilizing bar 320 is seen in FIGS. 5, 6, and 7. When used, stabilizing bar 320 is connected on each end to the L-shaped support member 6, 8, 22, 28 connected to the extensible support 340 for its associated row whereby it extends laterally with extensible support 340 and moves longitudinally with extensible frame 380. Each stabilizing bar 320 comprises a restricting contact associated with a horizontal surface of a switch 140 or switch support 310, thereby limiting angular movement about connecting node 354 and maintaining each switch 140 substantially horizontally disposed.

Each switch 140 comprises electrical connecting pins 152, a body 144, and a stem connector 142 as seen in FIG. 5. The body further comprises a proximal side 146 and a switch support 310 laterally engaging side 148 whereat each switch 140 is attached to a switch support 310. As earlier described, each switch is mechanically or adhesively attached to a switch support 310, a mechanical connection being made by rivets or nuts and bolts inserted through available mounting holes in the body 144 of each switch 140. Metal to plastic adhesives or epoxies are known in the art for bonding switch supports 310 to switch bodies 144 for adhesive connection of each switch 140 to a switch support 310.

Figure 8:
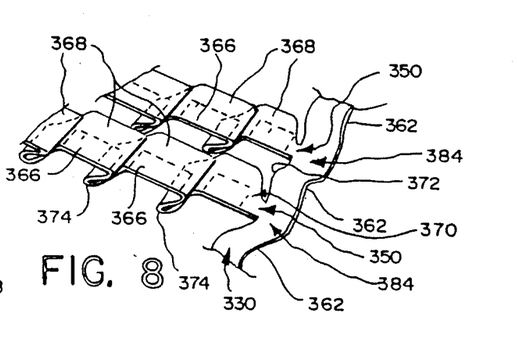
FIG. 8 is a view of partially folded flexible printed wiring.
Figure 9:
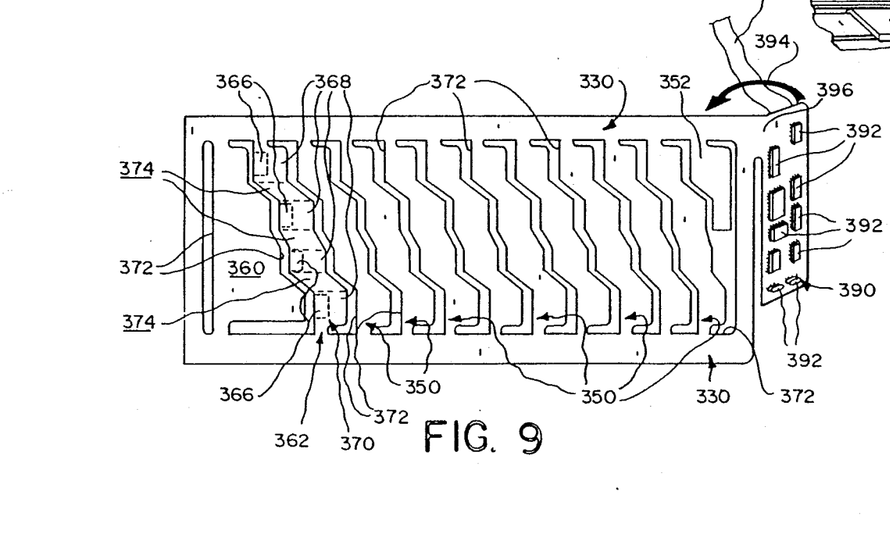
FIG. 9 is a top view of flattened printed wiring showing component mounting on a non-folding, stationary upper right hand corner of the printed wiring.

Connecting pins 152 of each switch 140 are soldered, welded or otherwise electrically connected to flexible printed wiring 360, seen in part in FIGS. 5 and 8. An overhead view of flexible printed wiring 360 for keyboard 10 is seen in FIG. 9. Flexible printed wiring 360 comprises a plurality of cuts 372 whereat material is removed, thereby providing relieved areas 384 where folds in remaining strips 350, 352, and 330 which result from keyboard 10 compaction occur as unidimensional creases.

Reference is now made to a segment 370, in FIG. 9, which is a strip 350 of printed wiring 360. Segment 370 is seen to comprise rectangular areas 366 inclosed by dashed lines, where switches 140 are connected, parallelogram areas 374, finitely defined by superior and inferior dashed lines, and areas 368, adjacent to rectangular areas 366. Folds occur in parallelogram areas 374 when the width of keyboard 10 decreases. Segment 370 is seen partially folded in FIG. 8, wherein each section, comprising an area 366 and 368, remains in a substantially planar state and each area 374 is folded, as when keyboard 10 is compacted thereby reducing the interswitch 140 distance. Other views of an area 374, lengthened and creased, are seen in FIGS. 6 and 7, respectively.

As it is important that the flexible wiring 360 is nearly crease free where electrical connections are made, inferior horizontal part 318 of switch support 310 comprises a support and stress relief for associated area 366 wherein electrical connection is made between pins 152 and flexible wiring 360. Position of inferior horizontal part 318, assembled under an area 366 is indicated by dashed lines 304 in FIG. 5. Adjacent area 368 is not supported by inferior horizontal support 318 and is free to glide freely between an adjacent switch assembly 190 and a floor section 38, 48, 68, 78, 88, or 98, dependent upon the associated switch assembly 190 position as keyboard 10 contracts. See FIGS. 2 and 3.

Referring again to FIG. 9, flexible wiring 360, as a result of cuts 372, comprise proximal and distal edges 330 which carry conductors from an electronic control section 390 to each wiring strip 350 and 352. As keyboard 10 contracts lengthwise, flexible wiring 360 also accrues a plurality of creases or folds in each edge 330. As seen in FIG. 8, each edge 330 comprises an area, where printed wiring enters a strip 350 contiguous with an area 362 which is adjacent to a cut 372. Cut 372 provides relief for area 362 whereby a simple fold occurs when keyboard 10 contracts. Thus strategic cutting of printed wiring 360 and us of supporting and stress relieving inferior horizontal part 318 assures simple one dimensional folding or creasing in flexible wiring 360 whereby long lived flexible wiring and reliable operation is realized.

An area of flexible printed wiring 360, printed wiring section 360 adjacent to stationary corner 30, is further isolated from folding as shown in FIG. 9. As earlier described, a slit 200, for trans-housing 20 access by an electrical communicating cable 398 whereby connection is made to other electrical equipment, is provided at stationary corner 30. Printed wiring section 390 comprises electronic components 392 which provide electrical timing, control, and communication circuits for keyboard 10 and cabling 398. Section 390 communicates with the rest of printed wiring 360 via printed wiring path 396. Cabling 398, shown in part, provides access external to keyboard 10 through cable slit 200. Section 390 comprises a part which folds orthogonal to path 396 whereby all of the electronic section is folded under other portions of printed wiring 360, as indicated by arrow 394. Thereat section 390 is stored in unfolding condition, providing keyboard 10 which is not further extended by an electronic control section.

Switches and other electronic parts used in the keyboard are standard components which are known and available in the art. Flexible printed wiring is also known and available and uses such materials as KAPTON, manufactured and distributed by Dupont Company, Eagle Run Site, P.O. Box 6099, Newark, Del., 19711-6099.

The degree to which a keyboard 10 is contractible is generally determined by size limiting conflicting parts such as switches and keypads. The restrictive effect of switches may be reduced by selecting smaller switches. However, a long history of use of keyboards teaches that the size of facing area of keypads in full sized keyboards may not be considered as a variable. In the currently preferred embodiment seen in part in FIGS. 2 and 3, keypad facing areas are maintained at current standard sizes. However, pad thickness and pad skirt size are changed to allow compaction.

Figures 2, 4:
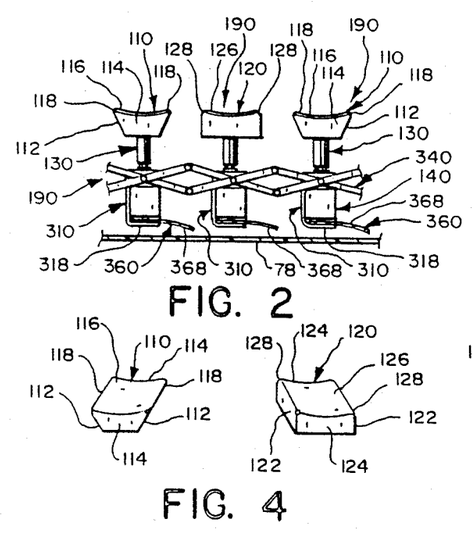
FIG. 2 is a side view, taken along lines 2—2 of FIG. 1, of three widely separated switch assemblies.
FIG. 4 is a perspective of two different keycaps used in the keyboard of FIG. 1.

In FIG. 4, two types of keypads are seen. Keypad 110, seen on the left, comprises a standard size facing area 116, vertical proximal and distal sides 114, and left and right sides 112 which slope inwardly from raised corners 118. Keypad 120, on the right, comprises a standard size facing area 126, four vertical sides comprising juxtaposed side pairs 122 and 124, and rounded corners 128. Raised corners 118 are slightly superior to rounded corners 128 such that, when keyboard 10 is contracted, keypad 110 tends to force neighboring keypad 120 downward upon contact. On switches 140 used on keyboard 10, travel allowed by stem 130 and switch 140 is sufficient to allow keypad 120 to be forced downward to the sandwiching inferior position seen in FIG. 3. Thus, the limit of lateral contraction of keyboard 10 is not a direct result of the size of keypads 110 and 120 as a section of keyboard 10 is seen contracted until further limited by the size of switches 140.

Compaction of switch assemblies 190 in the other direction as seen in FIGS. 6 and 7. In the currently preferred embodiment, the contractible width of keyboard 10 is substantially limited by the combined length of switches 140 and extensible support 340.

Referring once again to FIGS. 1 and 5, between each keypad, 110 or 120, and switch 140 is a dust cover 180. Dust cover 180 is made from a light dust impermeable material which comprises a hole 182 for each stem 130 and easily folds in a plurality of dimensions. The dust cover thus follows the path of each stem to effectively isolate and protect moving and electrical parts from view and contamination.

Figure 10:
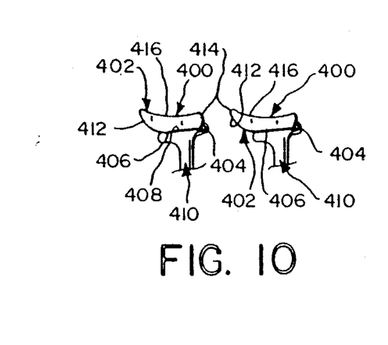
FIG. 10 is a side view of two adjacent keypads and stems showing a living hinge connection between each keypad and stem which permits each keypad to incline upwards from one side when the keyboard compacts.
Figure 11:
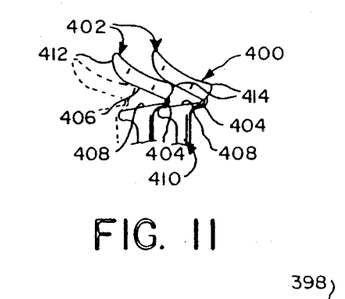
FIG. 11 is a side view of a plurality of key-caps, including the two key-caps seen in FIG. 10, inclining and closely packed.
Figure 12:
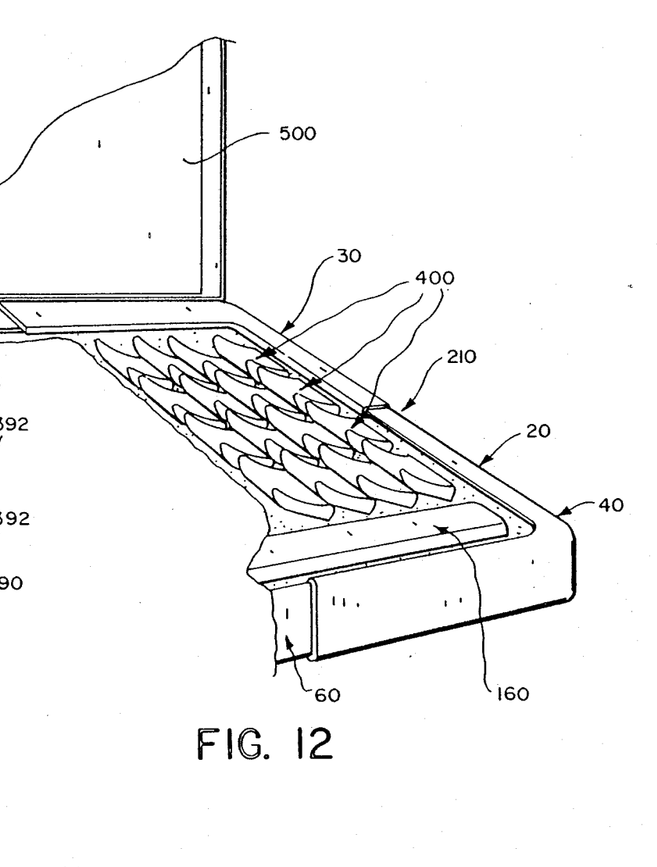
FIG. 12 is a perspective of a section of a compacted keyboard comprising a plurality of closely packed, inclining key-caps.

Another preferred embodiment of a keyboard 210, as seen in FIGS. 10-12, comprises keypads 400 which compact by tilting rather than sandwiching. While the invention is not restricted by the method of compaction of the various parts, this method of compaction provides switch packing with a nominal increase in vertical height of keyboard 10. As seen in FIG. 10, each key 400 comprises a keypad 402 and stem 410 molded as a single part. Keypad 402 is tied by a tether 404 which forms a "living hinge" connection to stem 410. When in the extended or protracted position, each keypad 402 is substantially level as the result of its bottom surface 406 resting upon the top surface 408 of stem 410.

Distal from stem 410, bottom surface 406 curves upward forming a rising surface 412 which continues distally upward until reaching the highest point at intersection with the top surface 416 of keypad 402. Opposite intersection of surface 412 and top surface 416 and proximal to tether 404, to surface 416 comprises a rounded edge 414. Rounded edge 414 is inferior to the highest edge of surface 412. When the surfaces contact upon compaction, as seen in FIG. 11, such compaction causes the keypad 402 of each so contacted switch 400 to tilt upward. As seen in FIG. 12 with keyboard cover 500 raised exposing housing 20 and keyboard 210, a length reducing contraction of housing 20 tilts keypads 402 thereby providing a reduced length keyboard 210.

Odd sized keypads such as keypads 170 and 150 and space bar 160, as seen in FIG. 1, are provided with inter key spacing such that compaction is not inhibited by conflicts with neighboring keys. Each such key is connected to a node 354 such that movement of each odd sized keypad is proportionally the same as other keypads. Space is allowed for proportional movement of each odd sized key to thwart undesired keypad impact.

The reduced lengths of keyboards 10 and 210 are compatible with the dimensions of smaller displays used in lap-top computers and the like. Thus, each compacted keyboard 10 or 210 is hingeably attachable to a lap top as a cover or the like. Yet, when opened, each keyboard 10 and 210 expands to a standard sized part.

When compacted, each keyboard 10 or 210 comprises parts so closely packed the keys are unusable. To use a keyboard 10 or 210, housing 20 is unlatched from any storage position and expanded in away from the stationary corner 30. Then keyboard 10 or 210 is expanded laterally to achieve desired lateral keypad 110-120 or 402 spacing, respectively. Action of extensible supports 340 provides proportional key spacing. Flexible wiring 360 unfolds as each switch support 310 and associated switch assembly 190 moves. Similarly the width of each keyboard 10 or 210 is increased by extending housing 20 proximally, resulting in proportionally spaced rows. When each keyboard 10 or 210 is protracted to a desired size, that size is maintained by friction of feet 32, 42, 62, 72, 82, and 92 on the work surface, or by applying mechanical pressure against extensible frame supports 340 and 380 to hold at least one parallelogram 338 of at least one of each frame 340 and 380 in a fixed angular position.

Each keyboard 10 and 210 is compacted by releasing any position maintaining locks and reversing the protraction process.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An extendible and contractible keyboard assembly comprising:

a keyboard comprising a plurality of means for selectively, manually entering digital information, said means collectively occupying a given space, and means for simultaneously adjusting each of said means to increase or decrease the space occupied by the digital information entering means including means to dimensionally shrink or enlarge the keyboard to collectively change at least one peripheral dimension of said given space without reorientation relative to each other of the plurality of means for entering digital information.

2. The extendible and contractible keyboard assembly according to claim 1 wherein the selectively, manually digital information entering means comprise keys and associated electrical switches.

3. The extendible and contractible keyboard assembly according to claim 2 wherein the adjusting means comprise means for maintaining a proportionally constant spacing between the keys as the keyboard is extended and contracted.

4. The extendible and contractible keyboard assembly according to claim 2 wherein the adjusting means comprise locking means whereby spacing between the keys is selectively fixed in an extended predetermined arrangement.

5. The extendible and contractible keyboard assembly according to claim 2 wherein the selectively, manually entering means further comprise means for electronically transmitting entered digital information from the keyboard.

6. The extendible and contractible keyboard assembly according to claim 5 wherein the electronic transmitting means comprise means for communicating with the associated electrical switches.

7. A method for collectively changing the size of a keyboard comprising the steps of:

providing for selectively manual entry of digital information into the keyboard at digital information entry sites forming an array at the keyboard;

linearly changing the size of the digital information entering array while substantially maintaining proportionally constant spacing between the digital information entry sites;

thereafter, selectively manually entering digital information into the keyboard at said entry sites.

8. A linearly adjustable assembly for manual entry of digital data comprising:

a keyboard comprising a plurality of digital input keys and switches having a predetermined relative switch-to-switch ordination disposed generally in a two dimensional plane for selectively, manually entering digital information into the keyboard and, further comprising, means for extending and contracting the plurality of digital input keys and switches as a unit and at the same time thereby respectively increasing and decreasing inter-switch distances such that the side of the keyboard is changed generally within said two dimensional plane.

9. A linearly adjustable assembly for manual entry of digital data comprising:

a keyboard comprising:

means disposed generally in a two dimensional plane for selectively, manually entering digital information into the keyboard;

means for collectively extending and contracting the digital inflation entering means solely in at least one linear direction such that the size of the keyboard is changed generally within said two dimensional plane;

the digital information entering means comprising means for disabling the keyboard in the contracted state and means enabling the keyboard in the extended state.

10. The assembly according to claim 9 wherein the entering means comprise keys and associated electrical switches.

11. A linearly adjustable assembly for manual entry of digital data comprising:

a keyboard comprising:

means disposed generally in a two dimensional plane for selectively, manually entering digital information into the keyboard;

means for collectively extending and contracting the digital inflation entering means solely in at least one linear direction such that the size of the keyboard is changed generally within said two dimensional plane, said entering means comprising keys and associated electrical switches;

the extending and contracting means further comprising means for substantially maintaining proportionally constant spacing between the keys as the keyboard is extended and contracted.

12. The assembly according to claim 11 wherein the extending and contracting means comprise locking means whereby spacing between the keys is fixed after being adjusted to a predetermined position.

13. The assembly according to claim 11 further comprising electronic transmitting means which comprise means in communication with the electrical switches and for maintaining the digital information entering means in a selected position.

14. The assembly according to claim 11 further comprising means for electronically transmitting digital information entered at the keys and communicated across the electrical switches.

15. A method for collectively changing the generally two dimensional, generally planar extending array of digital entry sites of a keyboard between a contracted smaller generally planar size and an expanded, substantially larger generally planar size comprising the steps of:

providing for manual entry of digital information at the entry sites into the keyboard;

collectively physically enlarging the two dimensional, generally planar size of the array of digital entry sites whereby the relative, proportional distance between juxtaposed entry sites remains substantially the same as the general planar size of the array is substantially increased;

selectively manually entering digital information into the keyboard at the entry sites.

16. A method for contracting an extendible and contractible substantially planar oriented keyboard from occupying an extended, substantially planar, relatively large space to a contracted, substantially planar, relatively small space, comprising the steps of:

providing means for entering digital information into the keyboard which means further comprise means for individually, selectively digitally entering information and electrical switches associated therewith;

compressing the means for entering digital information in at least one dimension while preserving said substantially planar orientation whereby the relative, proportional distance between the digital information entering means remains substantially the same and the inter-switch distance thereof and the space required therefor is substantially decreased.

17. A combination comprising:
a housing comprising a storage and transport compartment;
a dimensionally variable keyboard means comprising means which selectively accommodate reduced size storage of the keyboard means entirely within said compartment and selectively accommodate enlarged size utilization of the keyboard means;
said keyboard means further comprising means for digitally entering data comprising an array of keys, spacings between the keys, and means by which the spacings are proportionally varied as the keyboard means are expanded and compressed.

* * * * *